April 13, 1948.  S. KROLL ET AL  2,439,544
BABY CARRIAGE
Filed June 26, 1944  2 Sheets-Sheet 1
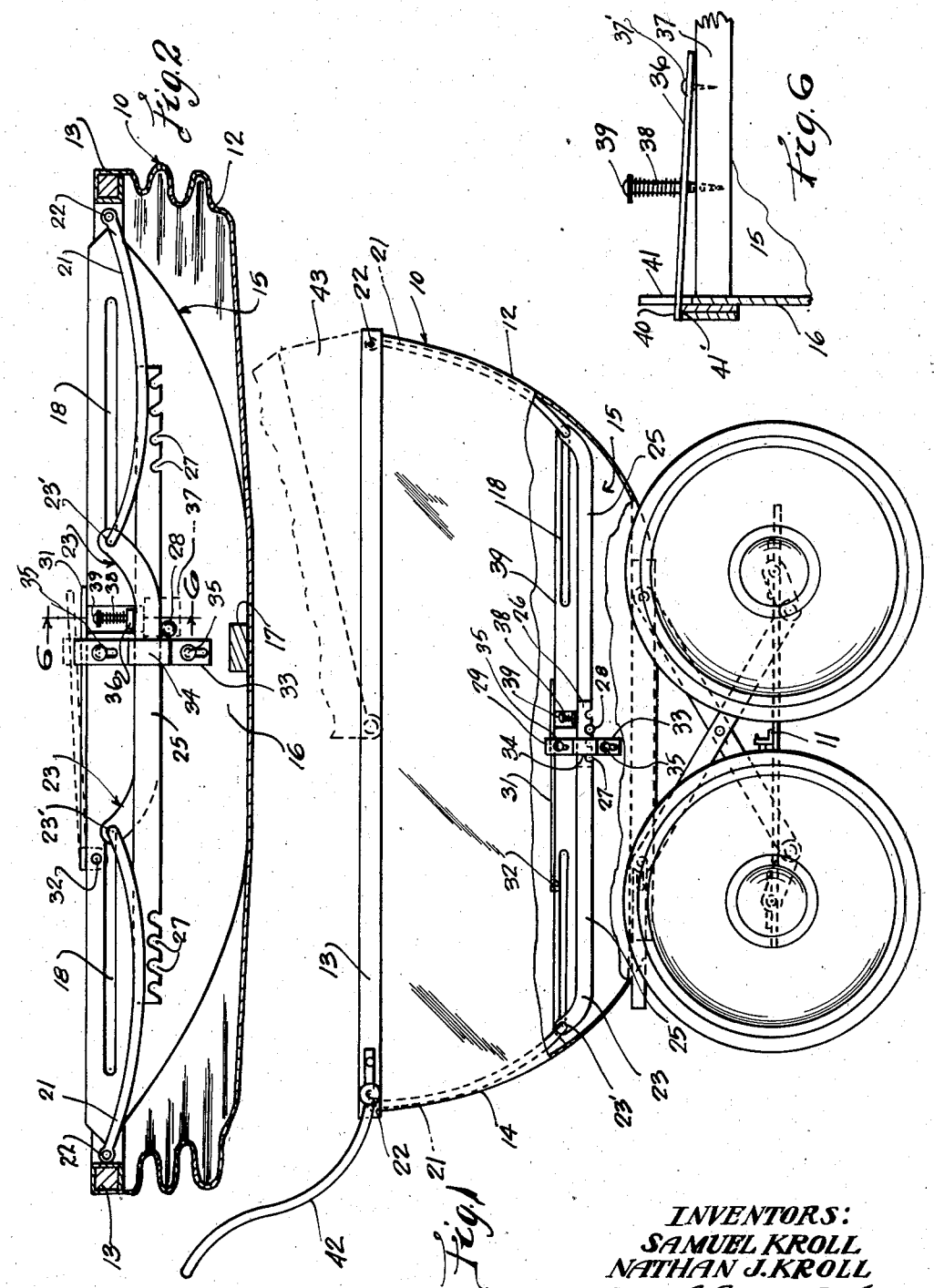
INVENTORS:
SAMUEL KROLL
NATHAN J. KROLL
BY
Their Attorney

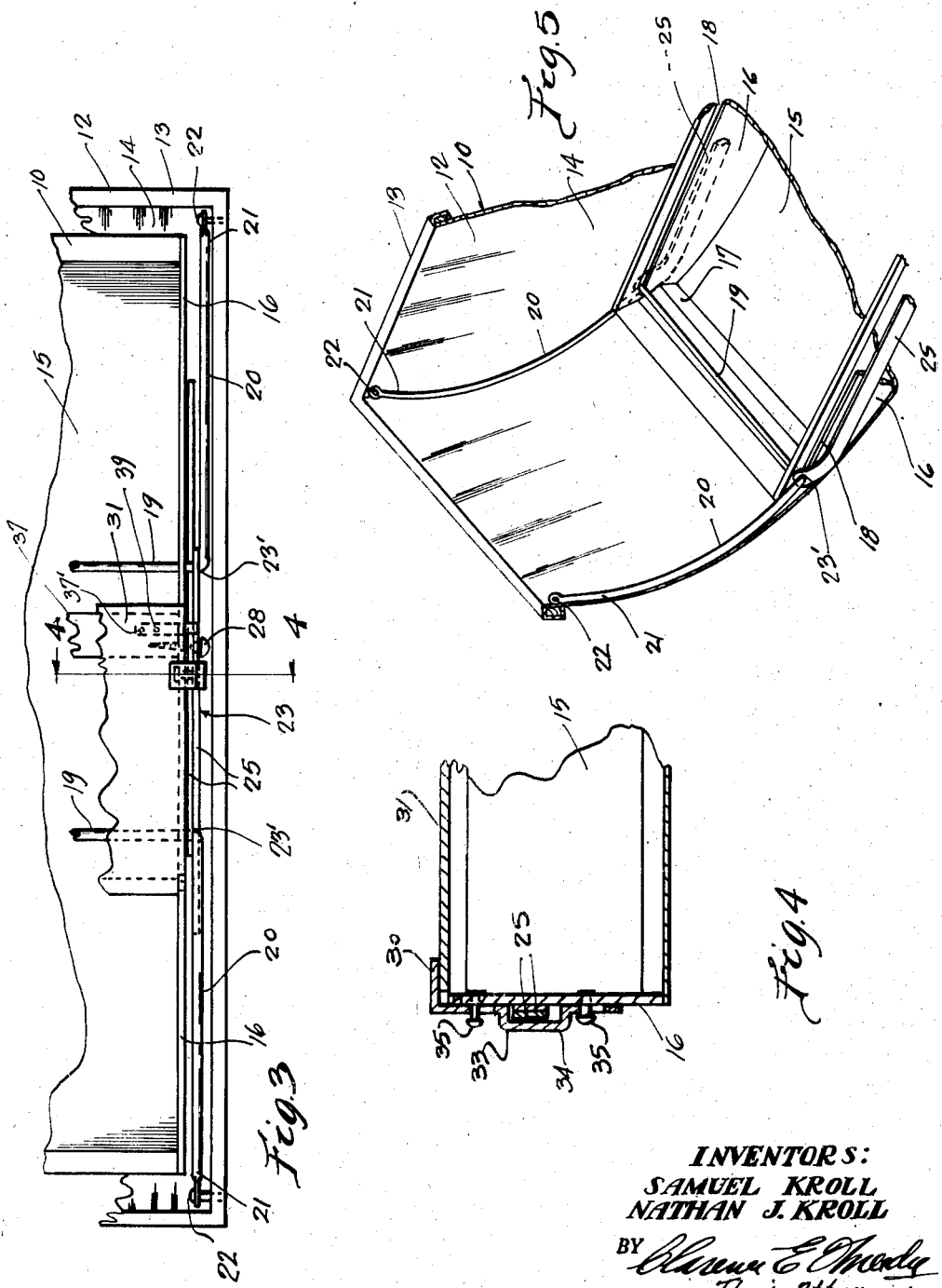

Patented Apr. 13, 1948

2,439,544

UNITED STATES PATENT OFFICE 2,439,544

BABY CARRIAGE

Samuel Kroll and Nathan J. Kroll, Chicago, Ill.

Application June 26, 1944, Serial No. 542,125

6 Claims. (Cl. 296—27)

This invention relates to baby carriages and more particularly to a baby carriage having a collapsible flexible body provided with means for holding the flexible body in taut extended position, and has for its principal object the provision of an improved construction of this character which will be highly efficient in use and economical in manufacture.

The present invention constitutes an improvement over that shown and described in our pending application, Serial No. 539,617, filed for Letters Patent on a collapsible baby carriage.

In collapsible baby carriages of the type hereinafter described and like that shown and described in our pending application above referred to, the acceptability of such carriage is greatly increased by the use of mechanism for collapsing the carriage, which may be conveniently operated by the mother with the minimum of effort and in which carriage there is no complicated mechanism to adjust to collapse the baby carriage. Having these factors in mind, it is an object of this present invention to provide a baby carriage having a flexible collapsible body in which the mechanism for permitting the collapsing of the body, while arranged within convenient reach of the mother, yet is substantially concealed from the baby, and which mechanism is capable of operation with the minimum of effort on her part.

A still further object of this invention is to provide a simple arrangement of parts for retaining the flexible body of the carriage in a taut, smooth and unbroken condition when in extended condition, thus avoiding the unpleasant wrinkles or creases usually appearing in the flexible body when in such extended condition.

Yet another object of the invention is the provision of stretching means for stay members of a collapsible body, which are positive in their operation and associated with means facilitating their operation with the minimum degree of effort on the part of the mother.

Yet a further object of the invention is the provision of mechanism for extending and collapsing a baby carriage which is substantially concealed from view and which in nowise will interfere with the use of the baby carriage when in extended condition.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of a baby carriage with parts broken away to illustrate our improvements therein;

Fig. 2 is a longitudinal sectional detail view of the flexible body showing the same in collapsed condition;

Fig. 3 is a fragmentary top plan view of the flexible body as illustrated in Fig. 2;

Fig. 4 is a fragmentary sectional detail view taken substantially on line 4—4 of Fig. 3;

Fig. 5 is a fragmentary perspective view of the flexible baby carriage body; and Fig. 6 is a sectional detail view taken substantially upon line 6—6 of Fig. 2.

The drawings illustrate the preferred form of construction of our invention by which the several objects thereof are accomplished.

In this connection the baby carriage is indicated generally at 10 and comprises a wheel-bearing chassis 11 on which the carriage body 12 is mounted in a manner such as that disclosed in our pending application, Serial No. 539,617. This carriage body comprises a substantially rigid frame 13 and a flexible body covering 14.

Within the body 12 there is arranged what is termed a footwell 15 comprising side walls 16 suitably braced by bar members 17. The side walls 16 of the footwell 15 are each provided at opposite end portions with elongated slots 18.

Mounted for movement in these slots 18 are the bight portions 19 of stay members 20. These stay members 20 are formed substantially U-shaped to provide opposite limb portions 21 pivotally connected to the rigid frame as at 22.

Connected to the stay members as at 23', at substantially the junction between the bight portions 19 and the limbs 21 of each stay members, are stretcher and retaining means 23. This means preferably comprises flat bars 25 arranged in pairs with each pair having overlapping end portions 26 and movable in opposite directions with respect to each other for reasons which will hereinafter become more apparent.

These overlapping end portions 26 of the bars 25 are provided with spaced teeth 27, and these teeth are each adapted to engage a pin 28 carried by the side wall of the footwell 15.

To disengage the teeth from the pin 28 there are provided lift plates 29, one on each side of the side walls 16 of the footwell 15. The upper end portions of these lift plates are angled inwardly as at 30 to rest upon the cover member 31, hinged as at 32 to the footwell 15. The depending portions 33 of these lift plates provide a bracket 34 for the passage of the overlapping portions 26 of the bars 25 and which also constitute a guide therefor. These lift plates have slot and pin connection with the footwell as at 35.

As best shown in Figs. 2 and 6, to hold the overlapping end portions of the bars 25 with the teeth thereof in engagement with the pins 28, we provide pressure plates 36. These plates 36 are each elongated in form and are secured as at 37' to a transverse bar 37 secured within the footwell 15. Bearing down upon each plate 36 is a spring 38 carried by a screw 39. The end 40 of each plate 36 projects through a slot 41 formed in the adjacent side wall 16 of the footwell 15. The end 40 of the plates 36 has bearing engagement with the top edges 41' of the bars 25. The arrangement is such that the bars 25 may have independent movement with respect to each other.

The wheel-bearing chassis 11 may be of the collapsible type and constructed in substantially the manner of that shown in our copending application, or, if desired, this wheel-bearing chassis may be of any well-known construction. In use, in order for the mother to collapse the carriage body 12 to substantially the position shown in Fig. 2, she firmly grasps the footwell cover member 31 to pivot the same about its pivot 32. In thus pivoting the cover member 31, the lift plates 29 are elevated and in turn pivot the bars 25 so as to disengage the teeth from the pins 28. This permits the bars 25 to move longitudinally toward each other during the guiding movement of the stays by the footwell 15, while the stays are moved substantially to the position shown in Fig. 2, with the body collapsed in substantially the manner shown.

To extend the carriage body 12 to the position shown in Fig. 1, the mother merely grasps the substantially rigid frame 13, lifting the body upwardly. As she thus lifts the body upwardly, the body moves to an extended position. During this movement, the stay members 20 are guided by the slots 19 to the position shown in Fig. 1. Also during this movement, the stretcher bars 25 move to their respective positions with the pins 28 engaging the adjacent teeth of the teeth 27. Should it be found that the flexible body is not taut, the mother then grasps the bight portions 19 of the stay members and moves them longitudinally in the slots 18, moving the stretcher bars 25 where the next succeeding teeth will engage the pins 28 and thus cooperate with the stay member 20 to hold the flexible body in taut and overlapping condition.

To complete the carriage the same may be provided with a collapsible handle 42 of any approved construction, and it also may include the usual adjustable hood 43.

The simplicity of construction of our invention is evidenced from the foregoing description. From this description it will be seen that we have provided a means for collapsing and extending a baby carriage which may be operated for the purpose with the minimum degree of effort on the part of the mother. It is also apparent that the construction heretofore described is positive in its operation and will effectively and safely retain the carriage body in extended condition until released by the other in the manner hereinbefore described for collapsing to the position shown in Fig. 2.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A baby carriage comprising a flexible body, stay members having corresponding end portions pivotally connected to said body, stretcher members having corresponding end portions connected to said stay members for moving said stay members in a position to extend said body in distended position, pin and ratchet means for holding said stretcher members in position to retain the stay members in body distended position, said stretcher members arranged in pairs with opposite end portions of said pairs disposed in overlapping relation with respect to each other and movable in opposite longitudinal directions.

2. A baby carriage comprising a flexible body, stay members having corresponding end portions pivotally connected to said body, stretcher members having corresponding end portions connected to said stay members for moving said stay members in a position to extend said body in distended position, pin and ratchet means for holding said stretcher members in position to retain the stay members in body distended position, said stretcher members arranged in pairs with opposite end portions of said pairs disposed in overlapping relation with respect to each other and movable in opposite longitudinal directions, and means for releasing said stretcher members from said pin and ratchet connection to permit said stay members to move into a position to collapse said body.

3. A collapsible carriage comprising a flexible body having a substantially rigid rim, a footwell mounted in said body, stay members having corresponding end portions pivotally connected to said rim, guiding means provided by said footwell for said stay members, ratchet means for releasably latching said stay members in position to hold said body in extended condition, and means including a cover member pivotally carried by said footwell for releasing said ratchet means to permit said stay members to be guided by said guiding means into position to collapse said body.

4. A collapsible carriage comprising a flexible body having a substantially rigid rim, a footwell mounted in said body, stay members having corresponding end portions pivotally connected to said rim, guiding means provided by said footwell for said stay members, ratchet means for releasably latching said stay members in position to hold said body in extended condition, and means for releasing said ratchet means to permit said stay members to be guided by said guiding means into position to collapse said body, said ratchet means comprising bar members arranged in pairs with the ratchet bearing ends of said bar members disposed in overlapping position and movable in opposite directions with respect to each other upon collapsing and extending of said flexible body.

5. A collapsible carriage comprising a flexible body having a substantially rigid rim, a footwell mounted in said body, stay members having corresponding end portions pivotally connected to said rim, guiding means provided by said footwell for said stay members, ratchet means for releasably latching said stay members in position to hold said body in extended condition, and means including a cover member pivotally carried by said footwell for releasing said ratchet means to permit said stay members to be guided by said guiding means into position to collapse said body, said ratchet means comprising bar members arranged in pairs with the ratchet bearing ends of said bar members disposed in overlapping position and movable in opposite directions with respect to each other upon collapsing and extending of said flexible body.

6. A collapsible carriage comprising a flexible body having a substantially rigid rim, a footwell mounted in said body, stay members having corresponding end portions pivotally connected to said rim, guiding means provided by said footwell for said stay members, and ratchet means for releasably latching said stay members in position to hold said body in extended condition, said ratchet means comprising bar members arranged in pairs with the ratchet bearing ends of said bar members disposed in overlapping position and movable in opposite directions with respect to each other upon collapsing and extending of said flexible body.

SAMUEL KROLL.
NATHAN J. KROLL.

REFERENCES CITED

The following references are of record in the file of this patent:

UNITED STATES PATENTS

| Number | Name | Date |
|---|---|---|
| 454,460 | Dye | June 23, 1891 |
| 698,101 | Broadbelt | Apr. 22, 1902 |
| 795,188 | Barratt | July 18, 1905 |
| 825,313 | Greene | July 10, 1906 |
| 1,272,881 | Adams | July 16, 1918 |
| 1,289,701 | Doty | Dec. 31, 1918 |
| 1,817,513 | Headley | Aug. 4, 1931 |
| 2,037,988 | Larsen | Apr. 21, 1936 |
| 2,196,834 | Mahr | Apr. 9, 1940 |

FOREIGN PATENTS

| Number | Country | Date |
|---|---|---|
| 640,844 | France | Apr. 7, 1928 |